US011042615B2

(12) United States Patent
Matsuda

(10) Patent No.: US 11,042,615 B2
(45) Date of Patent: Jun. 22, 2021

(54) INFORMATION PROCESSING APPARATUS AND METHOD

(71) Applicant: CANON KABUSHIKI KAISHA, Tokyo (JP)

(72) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 16/016,372

(22) Filed: Jun. 22, 2018

(65) Prior Publication Data

US 2019/0005219 A1   Jan. 3, 2019

(30) Foreign Application Priority Data

Jun. 29, 2017   (JP) .............................. JP2017-128048

(51) Int. Cl.
*G06F 21/32* (2013.01)
*H04L 9/08* (2006.01)
(Continued)

(52) U.S. Cl.
CPC ............ *G06F 21/32* (2013.01); *H04L 9/0866* (2013.01); *H04L 9/0894* (2013.01);
(Continued)

(58) Field of Classification Search
CPC ..... G06F 21/32; H04L 9/0866; H04L 9/0894; H04L 9/3231; H04L 63/0823; H04L 63/083; H04L 63/0861
(Continued)

(56) References Cited

U.S. PATENT DOCUMENTS

| 2004/0073432 | A1* | 4/2004 | Stone | G06F 3/0488 |
| | | | | 704/275 |
| 2007/0168674 | A1* | 7/2007 | Nonaka | G06Q 20/40975 |
| | | | | 713/182 |

(Continued)

FOREIGN PATENT DOCUMENTS

| CN | 101330386 A | 12/2008 |
| CN | 101957898 A | 1/2011 |

(Continued)

OTHER PUBLICATIONS

Ogata, et al., "A Study of an Authentication Method Using a Public Key and a Private Key in Security, Usability and Operation", NTT Network Service Systems Laboratories, NTT Corporation, Japan, Nov. 2015.

(Continued)

*Primary Examiner* — Jacob Lipman
(74) *Attorney, Agent, or Firm* — Canon U.S.A., Inc. IP Division

(57) ABSTRACT

An information processing apparatus displays a control, based on generation instructions of the control to accept a user operation, such that information indicating biometric authentication is requested is added to the control, executes a processing request corresponding to the control when the user operation on the displayed control is detected, and transmits, to a request destination of the processing request, data based on a result of biometric authentication using biometric information read by the information processing apparatus and stored biometric information. Information related to processing corresponding to the control is displayed based on the processing request and the data based on the result of the biometric authentication.

19 Claims, 14 Drawing Sheets

(51) Int. Cl.
  *H04L 29/06* (2006.01)
  *H04L 9/32* (2006.01)
(52) U.S. Cl.
  CPC .......... *H04L 9/3231* (2013.01); *H04L 63/083* (2013.01); *H04L 63/0823* (2013.01); *H04L 63/0861* (2013.01)
(58) Field of Classification Search
  USPC .............................................. 726/6
  See application file for complete search history.

(56) References Cited

U.S. PATENT DOCUMENTS

| | | | | |
|---|---|---|---|---|
| 2009/0150671 | A1* | 6/2009 | Abe | H04L 63/0823 713/169 |
| 2009/0176566 | A1* | 7/2009 | Kelly | G07F 17/3206 463/29 |
| 2012/0144204 | A1 | 6/2012 | Litz | |
| 2013/0340041 | A1 | 12/2013 | Bansal | |
| 2016/0092018 | A1* | 3/2016 | Lee | G06F 1/1643 345/173 |
| 2016/0364591 | A1 | 12/2016 | El-Khoury | |
| 2018/0234415 | A1* | 8/2018 | Fukuda | A61B 5/6826 |
| 2018/0341759 | A1* | 11/2018 | Sato | G06F 3/1204 |

FOREIGN PATENT DOCUMENTS

| | | |
|---|---|---|
| CN | 102143134 A | 8/2011 |
| CN | 104660412 A | 5/2015 |
| CN | 104933343 A | 9/2015 |
| CN | 105844462 A | 8/2016 |
| CN | 105847247 A | 8/2016 |
| CN | 106549973 A | 3/2017 |
| JP | 2003-143136 A | 5/2003 |
| JP | 2006260315 A | 9/2006 |
| JP | 2008-523460 A | 7/2008 |
| JP | 2008-217187 A | 9/2008 |
| JP | 2017-504853 A | 2/2017 |

OTHER PUBLICATIONS

Muramoto, "Fingerprint authentication app lock is super convenient", https://k-tai.watch.impress.co.jp/docs/column/minna/742999.html, Feb. 16, 2016.

* cited by examiner

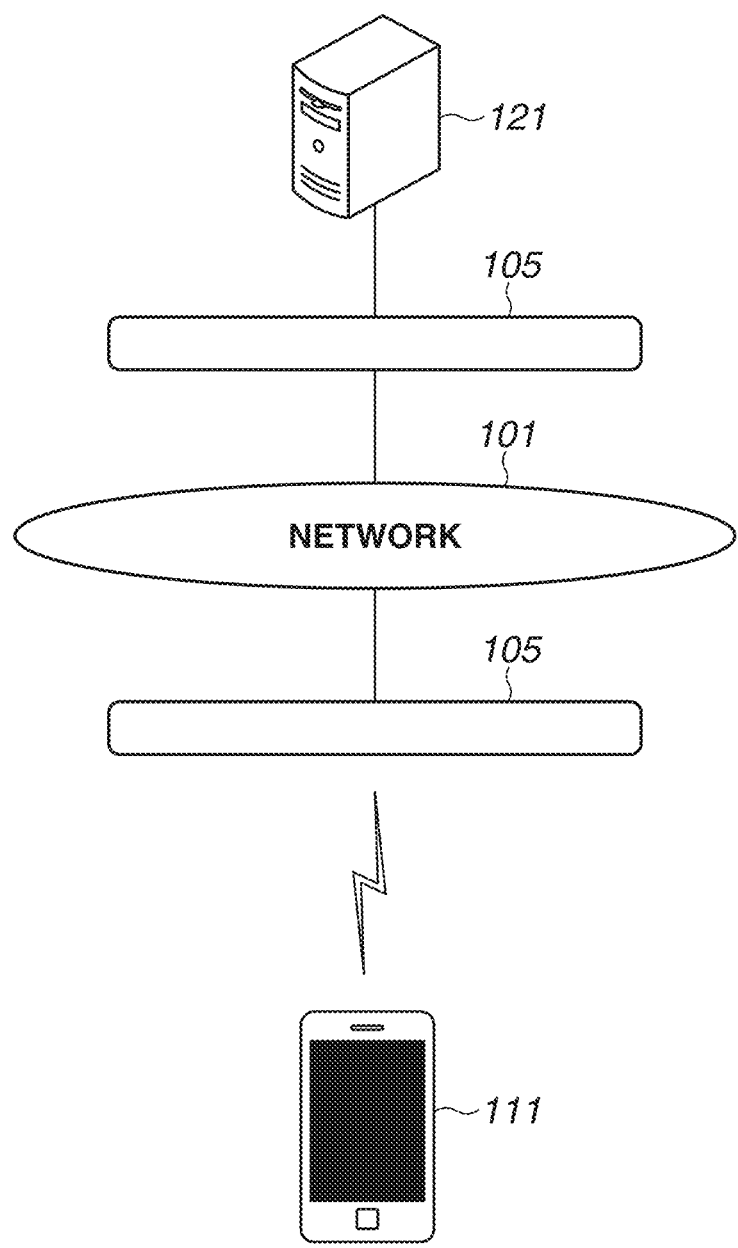

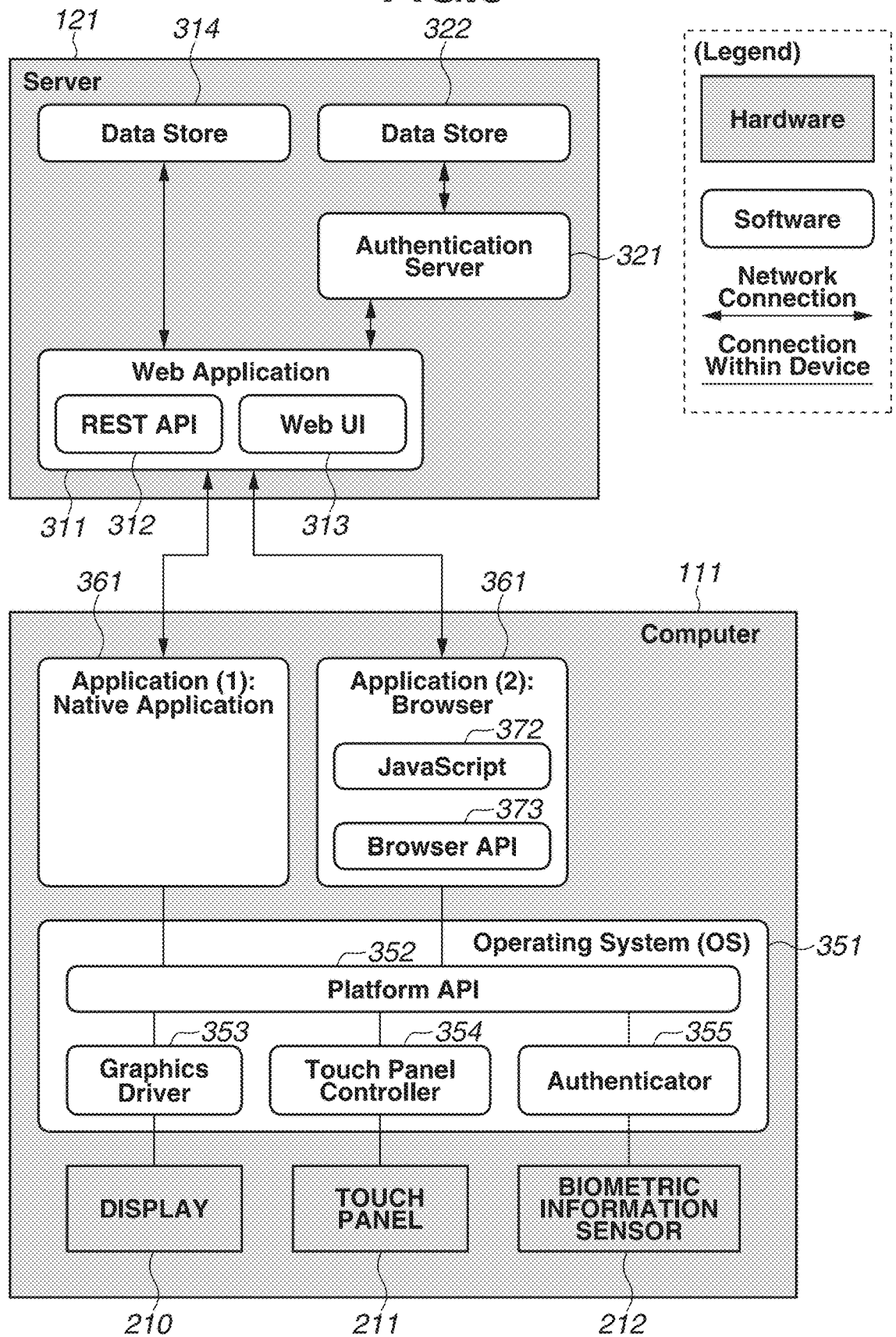

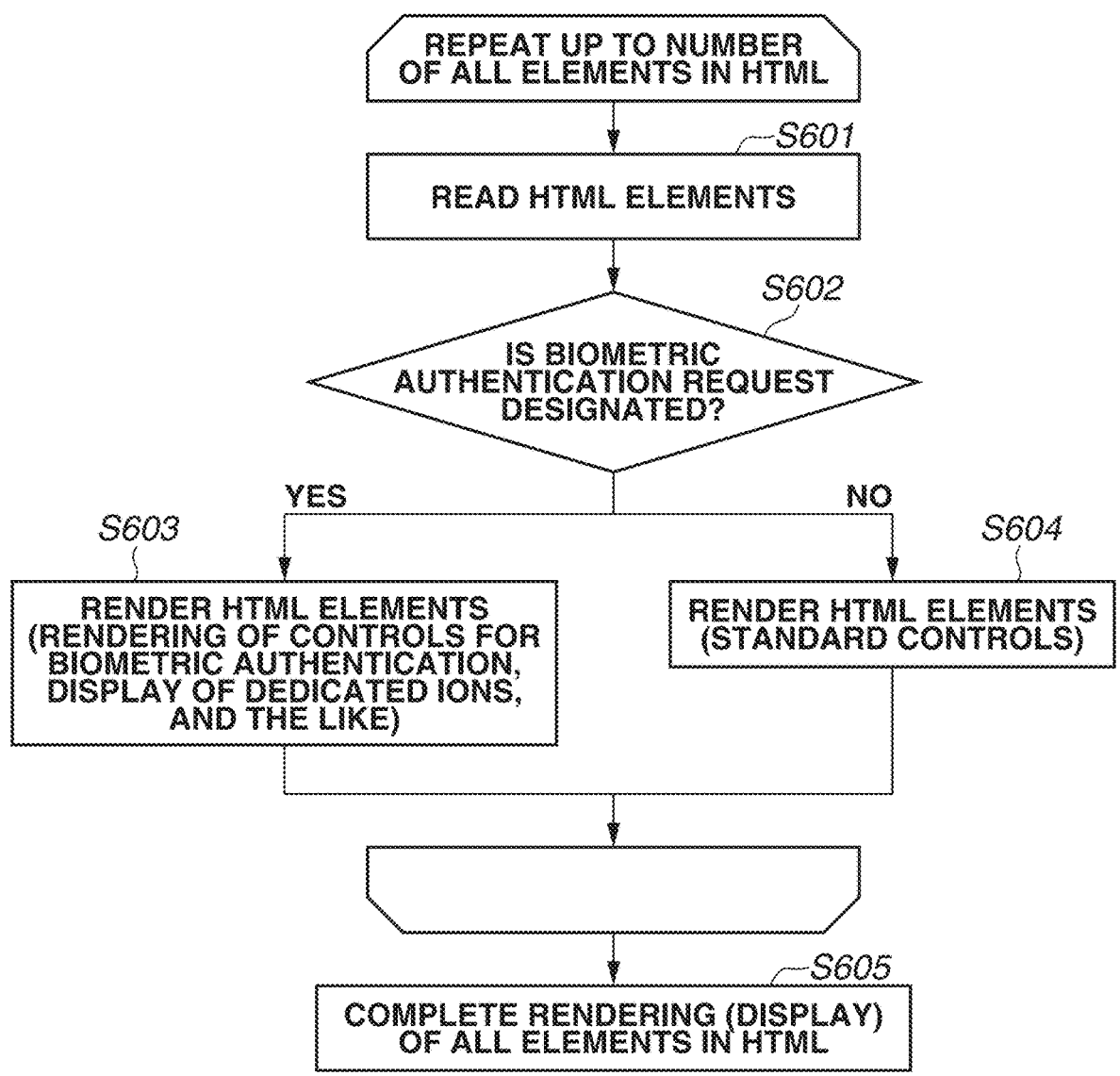

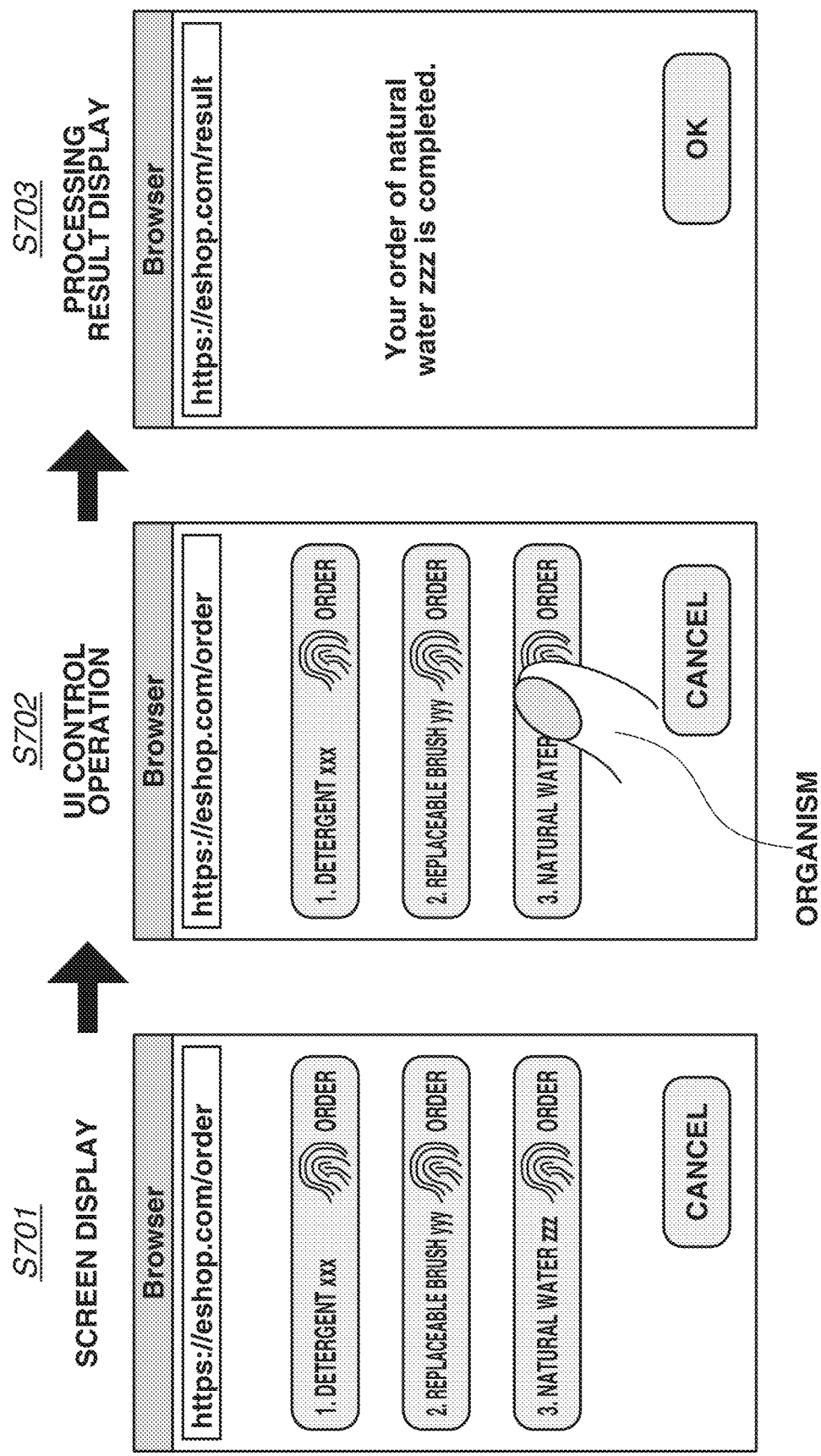

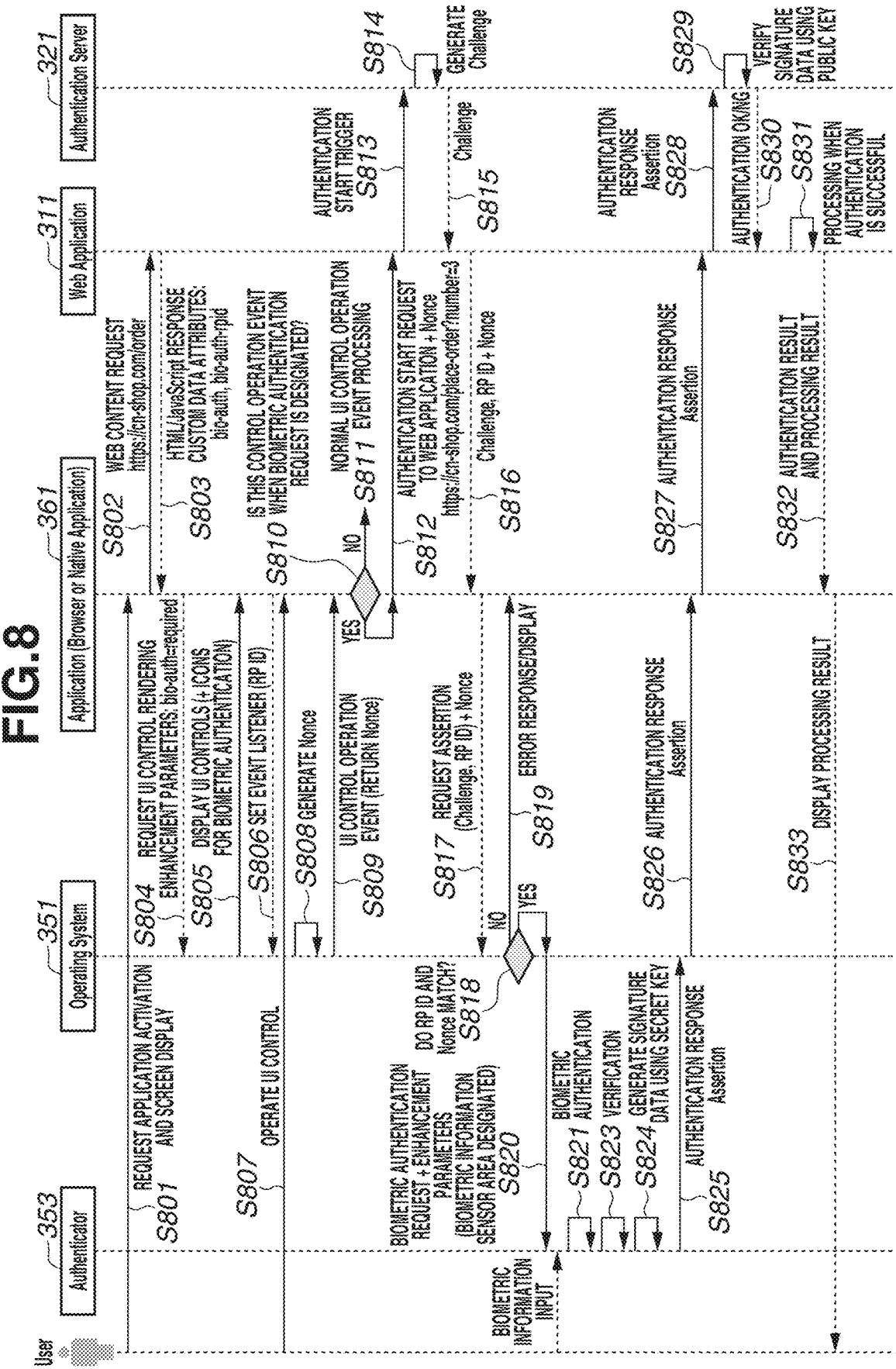

INFORMATION PROCESSING APPARATUS AND METHOD

BACKGROUND

Field

The present disclosure relates to control when a service using biometric authentication is used.

Description of the Related Art

In recent years, portable devices such as smartphones and tablet computers have come into wide use. In addition, technological development of components, such as displays, sensors, and processors, installed on information processing apparatuses, such as these mobile devices, has advanced.

In recent years, a fingerprint sensor has been mounted as standard equipment on a rear side or other positions of devices such as smartphones so that authentication means of biometric authentication has been used more frequently by user's. Smartphones, tablet computers, and other devices are provided with a user interface (UI) using a touch panel display as standard equipment that enable users to operate these devices mainly by the users' fingers.

In smartphones, tablet computers, and other devices that use legacy authentication, such as a password system, biometric authentication provides an authentication system that improves security and convenience. For example, when an application is purchased at an application store, a procedure including the following steps is performed:
1. purchase instruction (UI operation),
2. authentication (legacy authentication or biometric authentication), and
3. purchase processing result display.

In step 2, both the legacy authentication and the biometric authentication can be used.

In Japanese Unexamined Patent Application Publication (Translation of PCT Application) No. 2008-523460, a fingerprint reader includes, for example, movably arranging one or more fingerprint scanners on a rear side of a dynamic display in a user interface including the dynamic display and touch screen input to interface-connect a medical system and medical staff. A technique is disclosed that user identification and authentication are provided by identifying, when a touch operation is input into the user interface, a touch position, and using a fingerprint read by the fingerprint scanner moved to the identified position.

The biometric authentication can also be used when a web service that needs authentication with respect to a terminal of a smartphone, a tablet computer, and other devices is provided. In this example, the biometric authentication is requested when a purchase instruction is given. For the web service that makes a request of the biometric authentication, authentication is requested when, from among operations on several objects (UI controls such as buttons) displayed on to terminal to accept an user input, an operation for specific processing such as activation or purchase is performed. A mechanism of high operability is needed for intentionally causing, for that operation only, the user to input biometric information of the user until authentication inside the terminal is completed.

SUMMARY

According to an aspect of the present disclosure, an information processing apparatus, includes an authentication module that executes biometric authentication, a storage area having tamper resistance, wherein the storage area stores biometric information of a user required when authentication processing is performed by the authentication module, a biometric information sensor that reads the biometric information, a display, a memory storing instructions, and a processor executing the instructions causing the information processing apparatus to display on the display, based on a generation instruction of a control to accept a user operation, the control in a state where information indicating that the biometric authentication that is requested is added to the control, make a processing request corresponding to the control when the user operation on the displayed control is detected, and transmit, to a request destination of the processing request, data based on a result of the biometric authentication using biometric information read via the biometric information sensor at a position where the control, which is a user operation target, is displayed and the biometric information stored in the storage area, wherein information related to processing corresponding to the control is displayed on the display based on the processing request and the data based on the result of the biometric authentication.

Further features will become apparent from the following description of exemplary embodiments with reference to the attached drawings.

BRIEF DESCRIPTION OF THE DRAWINGS

FIG. 1 illustrates a system configuration example according to an exemplary embodiment.

FIG. 3 illustrates software and hardware configuration examples of respective devices in the system according to an exemplary embodiment.

FIG. 6 is a flowchart illustrating generation processing of the user interface illustrated in FIG. 4.

FIG. 7 illustrates a user interface screen transition example of the computer.

FIG. 8 illustrates a sequence of overall processing by the computer and a server.

DESCRIPTION OF THE EMBODIMENTS

Hereinafter, exemplary embodiments for carrying out the present disclosure will be described with reference to the drawings.

FIG. 1 illustrates an example of a system configuration according to an exemplary embodiment.

A network 101 includes the Internet and an intranet. A network 105 includes a private network and a local area network (LAN). The network 105 is a distal network that connects devices such as computers, and can be either a wired communication network or a wireless communication network, such as a wireless LAN or a cellular phone communication network. A computer 111 includes various forms and types of computers, such as personal computers, laptop computers, tablet computers, and smartphones. The computer 111 includes devices communicating with a web service and equipped with a touch panel, such as digital cameras, printers, on-board devices (car navigation systems), and home assistance robot or nursing care robot. A server 121 provides web services, such as web sites and web applications, via a network.

Figure 2A:
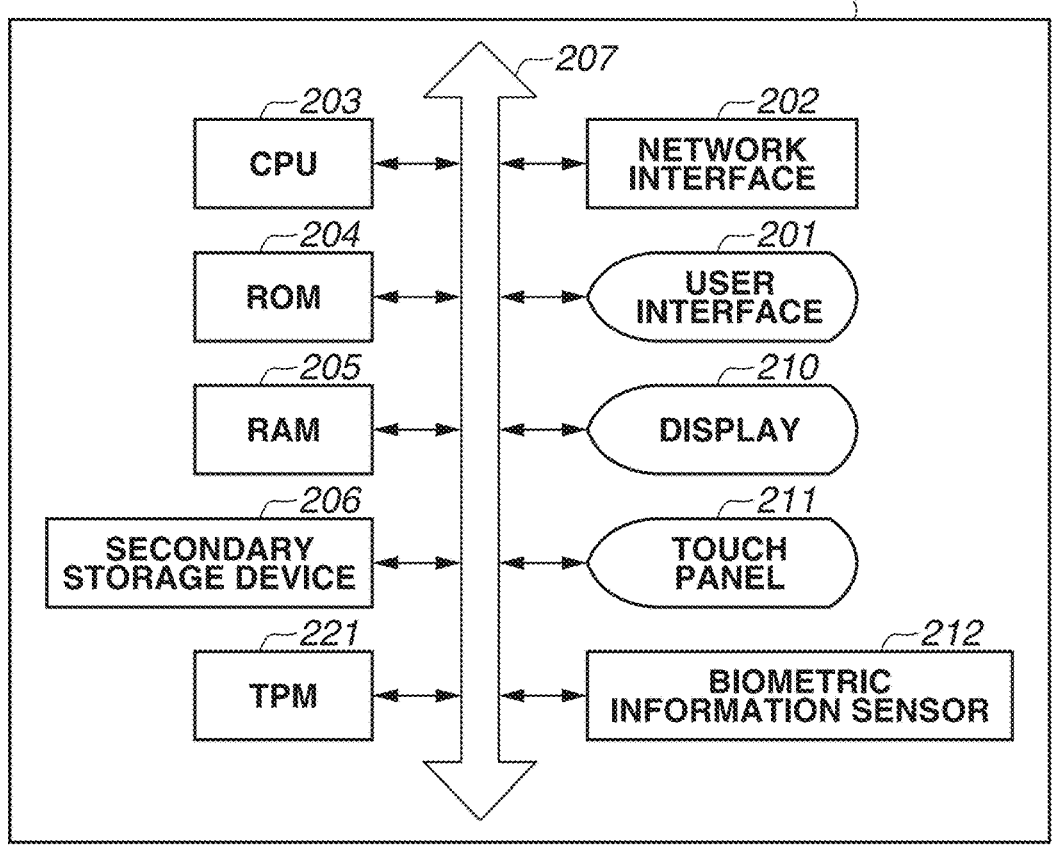
FIGS. 2A and 2B illustrate hardware configuration examples of an information processing apparatus.
Figure 2B:
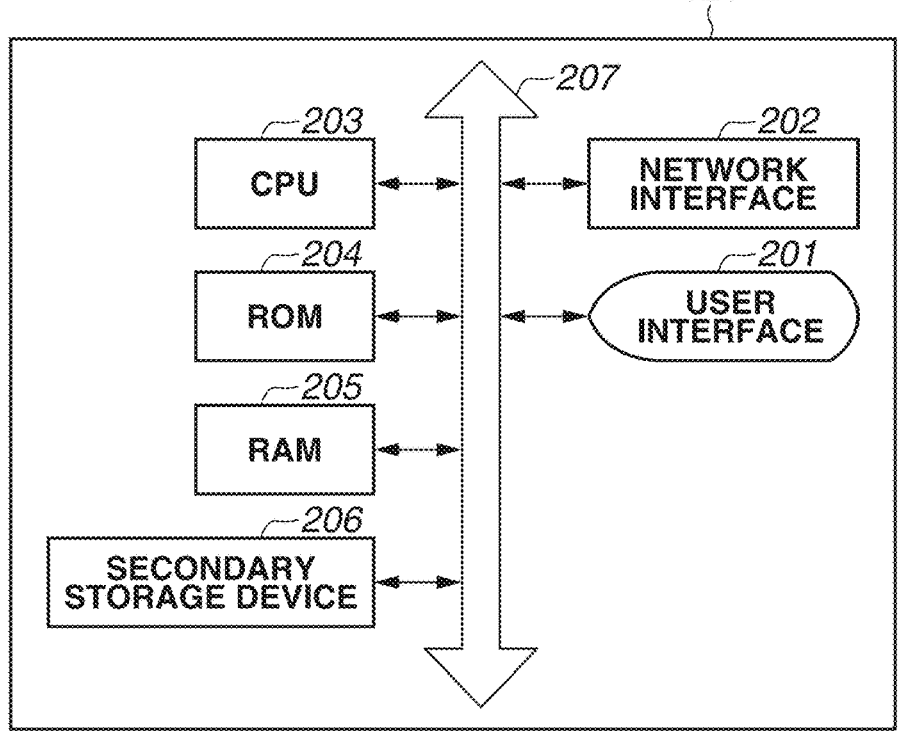

FIG. 2A illustrates a module configuration example of information processing apparatus hardware including the computer 111. FIG. 2B illustrates a module configuration example of information processing apparatus hardware including the server 121.

In FIG. 2A, a network interface 202 is connected to a network, such as a LAN, to communicate with other computers and network devices. The connection can be wired or wireless. A read-only memory (ROM) 204 stores an embedded program and data. A random access memory (RAM) 205 is a memory used as a temporary memory area. A secondary storage device 206 is a storage device represented by, for example, a hard disk drive (HDD) or a flash memory. A central processing unit (CPU) 203 executes a program read from the ROM 204, the RAM 205, or the secondary storage device 206. The secondary storage device 206 also stores, for example, a software program to implement processing in the below-described flowcharts. A user interface 201 enables a user to input information a signal using a keyboard, a mouse, a button, or the like. A computer that does not include such hardware can be connected to and operated via another computer via a remote desktop or a remote shell. A display 210 is one user interface. A touch panel 211 is another user interface. The touch panel 211 detects an operation position/direction, an operation distance, and an operation pressure of a user's operation via a contact sensor, a pressure sensor or the like. A biometric information sensor 212 reads biometric information that relates to fingerprints, veins, irises, voice, facial images, etc. of a user. A Trusted Platform Module (TPM) 221 is a security chip functioning independently of an operating system and other hardware, is tamper resist, and serves as a storage unit to process and store confidential information. In the present disclosure, the biometric information, or feature amounts thereof, of the user used for the biometric authentication and a secret key needed for authentication processing described below are stored in the TPM 221. As an alternative to the TPM, the tamper resistance can be implemented by a method of securing a secure memory space isolated from other memory spaces on one chip and providing a storage unit to manage the biometric information, or the feature amounts thereof, of the user and the secret key in the memory space. Each unit is connected via an input/output interface 207.

In the present embodiment, the display 210, the touch panel 211, and the biometric information sensor 212 are integrally configured. More specifically, these hardware components are overlaid on each other so that a touch operation on the display 210 is detected and controlled by the touch panel 211 and an input of the biometric information, i.e., reading of fingerprint information associated with a touch, to any position on the touch panel 211 is detected and controlled by the biometric information sensor 212.

FIG. 2B illustrates a hardware configuration similar to that in FIG. 2A. Only a configuration needed to operate as the server 121 is illustrated and functions similar to those of the configuration described with reference to the same reference numerals in FIG. 2A and their associated description is omitted. The provided illustration is merely an example, and another common hardware configurations, such as a display, can also be included.

FIG. 3 is a diagram illustrating module configurations of software of respective devices in the present system. The hardware configurations described with reference to FIGS. 2A and 2B are also partly illustrated. Each of the illustrated module configurations of software is implemented by executing a program unique to the present disclosure by the CPU 203 and can communicate with each other as illustrated by arrows of network connection.

First, the configuration of the server 121 will be described.

A web application 311 is installed on the server 121. A Representational State Transfer (REST) Application Programming Interface (API) 312 is provided by the web application 311. A web UI 313 is provided by the web application 311. A data store 314 saves and stores data to be used by the web application 311. Based on a content of an HTTP request from a client, the web application 311 responds with a content file of HyperText Markup Language (HTML) or JavaScript® through the web UI 313, or with extended markup language (XML) or JavaScript Object Notation (JSON) data through the REST API 312.

An authentication server 321 is installed on the server 121. A data store 322 saves and stores data to be used by the authentication server 321. The authentication server 321 registers and manages an authentication system e.g., authenticator information, that can be used for each account of the user to verify an authentication assertion. The authentication server 321 does not directly store and manage the biometric information or feature amounts of the biometric information of the user. The authentication server 321 can also be located external to the server 121, i.e., connected to the server 121 over a network.

Next, the configuration of the computer 111 will be described.

An operating system (hereinafter, referred to as OS) 351 is installed on the computer 111. The OS 351 is basic software that manages and controls each piece of hardware of the computer 111 to manage execution of various programs. A platform API 352 is included in the OS 351, and controls an interaction with each piece of hardware via the OS 351. A graphics driver 353 controls the display 210. A touch panel controller 354 detects and processes signals of, for example, contact, position, and pressure from the touch panel 211. In the case of a touch panel display, the OS 351 renders UI controls on the display 210, and the touch panel 211 detects a UI control operation performed by the user and provides feedback to the OS 351.

An authenticator 355 authenticates the user based on the biometric information read from the biometric information sensor 212. In the present disclosure, the authenticator 355 is defined as an authentication module. A combination of the biometric information sensor 212 and the authenticator 355 can be referred to as an authentication module. The authenticator 355 stores an encryption key in, for example, a secure area of the TPM 221, and stores, in the secondary storage device 206, confidential information such as the read biometric information or the feature amounts thereof as encrypted data using the encryption key. When the user attempts biometric authentication, the authenticator 355 matches the stored biometric information or the feature amounts thereof with the biometric information provided by the user to determine whether the biometric authentication succeeded.

An application 361 is installed on the computer 111, and can be divided into two categories: native applications and browsers. A native application is an application described in a code that can directly be executed on the OS. The native application accesses each function provided by the OS 351 via the platform API 352. A browser is an application that displays and executes HTML and JavaScript®. JavaScript® 372 is executed on the browser. The browser acquires, executes, and displays HTML, JavaScript® 372, and the like from the web application 311 to be executed on the server 121 via a network. A browser API 373 is included in the browser so that a function provided by the OS 351 can be accessed by the JavaScript® 372 executed on the browser. When a function and data on a network is used, the native application is connected to the web application 311 to transmit and receive data via the REST API 312.

In some cases, user authentication is required to access a specific function or data by the application 361 connected to the web application 311. According to Fast IDentity Online (FIDO®) from the FIDO® Alliance, which is can be one authentication system used by the present disclosure, standard specifications to use biometric authentication for web authentication are released. The authenticator 355 for biometric authentication used for web authentication is registered in the authentication server 321 by the following procedure:

(1) Access the web application 311 from the application 361 and log based on legacy authentication, e.g., input of user name and password, of the authentication server 321.

(2) When a registration start request is transmitted from the application 361 to the web application 311, the authentication server 321 generates Challenge data and returns the Challenge data to the application 361.

(3) The application 361 transmits a credential generation request to the authenticator 355.

(4) Based on successful biometric authentication processing of the user in response to the credential generation request, the authenticator 355 generates a pair of secret key and public key.

(5) Associate the pair of secret key and public key with information of the user logged into the web application 311 by the authenticator 355. The secret key is stored in a secure area, such as the TPM 221, in the computer 111.

(6) The authenticator 355 generates credential information for registration. The credential information for registration includes a credential to individually identify the authenticator 355 and a signature generated from the public key and the Challenge described above using the secret key.

(7) The authenticator 355 transmits the generated credential information for registration to the authentication server 321.

(8) The authentication server 321 verifies the signature included similarly using the public key included in the received credential information for registration and stores information for identifying the authenticator, the public key, and the like in association with the user information.

After the registration processing, when the application 361 accesses the web application 311, a biometric authentication request (assertion request) including the Challenge as verification data generated by the authentication server 321 and in which a relying party identifier (RP ID) or the like is designated is transmitted to the application 361. At this time, the corresponding authenticator in the computer 111 generates a signature using the secret key obtained by executing the biometric authentication and the Challenge thereof. Then, authentication processing to log into the web application 311 is realized by the authentication server 321 verifying the signature. In other words, based on the specifications, biometric information for authentication does not flow through a network. In addition, after the registration processing, there is no need for legacy authentication using the password and other means.

Figure 4:
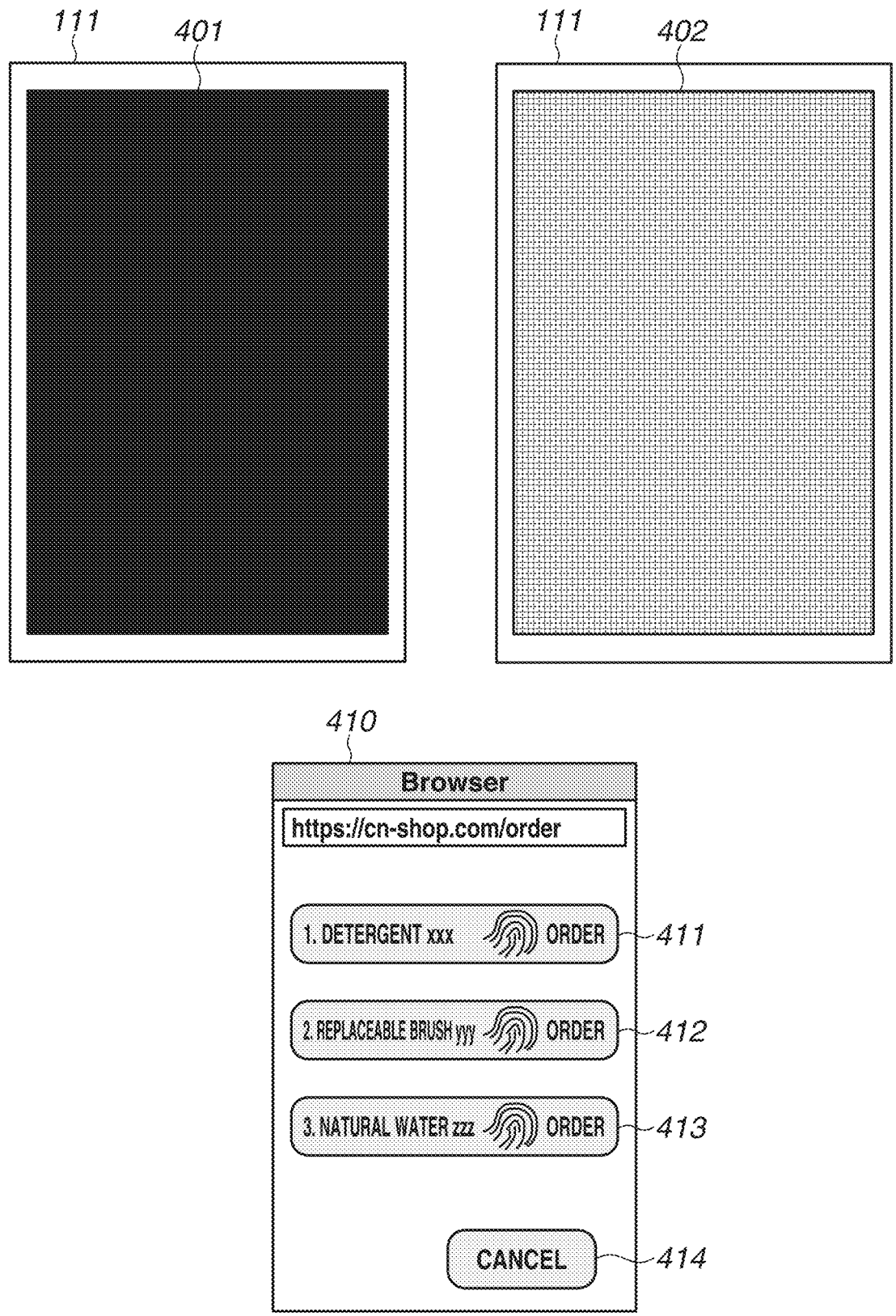
FIG. 4 illustrates a user interface example provided by a computer.

FIG. 4 illustrates a display example of UI control of the integrated biometric authentication displayed in the display 210 of the computer 111 in the present disclosure.

An area 401 is an example of the display 210 included in the computer 111 and also serves as the touch panel 211. A blackened area in FIG. 4 indicates a displayable range of the touch panel display and a touch operation detectable area. An area 402 illustrates a detectable area of biometric information, such as fingerprints, of the biometric information sensor 212 on the same surface of the display 210. A UI 410 illustrates a UI example of the application 361 displayed on the area 401. Controls 411 to 414 are examples of UI controls (button objects) arranged on the UI 410. The controls 411 to 413 are UI controls of the integrated biometric authentication. A standard UI control 414 does not need biometric authentication. The UI controls of the integrated biometric authentication can be arranged in any position within the detectable area 402 of the biometric information sensor 212.

Examples of a method of displaying the UI controls illustrated in FIG. 4 and a processing flow will be described with reference to FIGS. 5 and 6.

Figure 5:
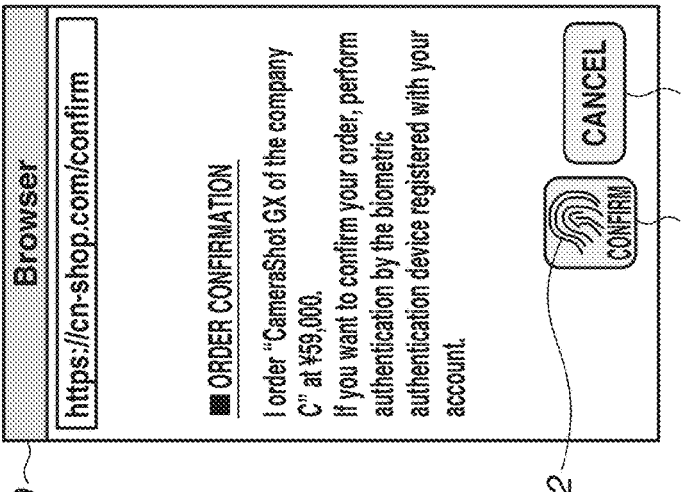
FIG. 5 is a diagram illustrating an implementation example of the user interface illustrated in FIG. 4.

An area 500 in FIG. 5 illustrates a portion of data described in markup language, e.g., HTML, displayed on a web browser as an example of the application 361. HTML elements 501 and 502 illustrate generation instructions to display UI controls.

The HTML element 502 corresponds to a standard UI control. The HTML element 501 corresponds to a UI control of the integrated biometric authentication. An example using a custom data attribute data-* of HTML5 to designate biometric authentication is assumed. A custom data attribute data-bioauth=""required" indicates that the control is the UI control of integrated biometric authentication. Similarly, a domain name is designated in a data-bioauth-rpid attribute as an RP ID to identify the web application 311.

An area 510 illustrates a UI display result of the HTML 500 on the browser. A control 511 is a UI control of the integrated biometric authentication designated by the HTML element 501. A control 513 is a standard button control designated by the HTML element 502. A biometric authentication icon 512 is intended, with the custom data attribute data-bioauth="""required", to indicate that the UI control 511 is a special control for biometric authentication. Based on the biometric authentication icon 512, the user can recognize that biometric authentication is requested for the operation. In addition, when the UI control 511 including the biometric authentication icon 512 is operated, compared with an operation (button pressing) on a normal control, a somewhat long pressing operation can be requested to read biometric information by the biometric information sensor 212 such as a camera or sensor. When fingerprint information is read, fingerprint information of a user's finger is read by a sensor while the user's finger is touching a portion of the biometric authentication icon 512. To read a face image for face image authentication or the like, a face image is read by capturing an image of the user through a camera (not illustrated) of the computer 111 while the portion of the biometric authentication icon 512 is touched. When reading is completed and the biometric authentication is successful, transition to the next screen, such as a purchase procedure complete screen, is performed.

FIG. 6 is a flowchart illustrating processing for reading and rendering HTML data illustrated in FIG. 5. This processing is implemented by the CPU 203 executing the application 361 for the browser.

In step S601, the browser reads an HTML element in the HTML 500 one by one. In step S602, the browser determines whether a biometric authentication request is designated with the attribute data-bioauth="'required" in the HTML element. If it is determined in step S602 that the biometric authentication request is designated (YES, in step S602), the processing proceeds to step S603. If it is determined that the biometric authentication request is not designated (NO, in step S602), the processing proceeds to step S604.

In step S603, the browser requests the OS 351 to render a UI control in the designated coordinates and sizes. The OS 351 renders the UI control 511 including the biometric authentication icon 512 on the display 210. In step S604, the browser requests the OS 351 to render a standard control and the OS 351 renders the standard control. When rendering of all the elements in HTML is completed, the illustrated loop processing ends, and in step S605, display of all UI controls on the UI 510 is completed.

FIGS. 5 and 6 illustrate an example in which the application 361 is a browser, but similar processing is performed when the application 361 is a native application. When the application 361 is the native application, the UI controls provided by the OS 351 can be directly rendered from inside the program. By addition of an attribute indicating biometric authentication to UI control rendering instructions for the OS 351 as in the case of using custom data attributes of HTML in the above example, the native application requests the OS 351 to render a special control for biometric authentication.

A processing flow based on user operations of a UI control of the integrated biometric authentication is described with reference to FIGS. 7 and 8.

FIG. 8 is a diagram illustrating a sequence of overall processing by the computer 111 and the server 121, including user operations.

In step S801, the user operates the application 361 to request activation of an application or screen display. In step S802, a browser as the application 361 that is the operation target transmits a web content request to the web application 311.

In step S803, the web application 311 responds with HTML data or JavaScript® as web content. For a UI control that needs biometric authentication, the custom data attributes described above with reference to FIG. 5 are added. When the application 361 of the operation target is a native application, instead of executing steps S802 and S803, a UI control rendered within a program is designated.

In step S804, the application 361 performs rendering processing of HTML data on the touch panel display 210. The application 361 requests the OS 351 to render the UI control by designating coordinates and sizes via the platform API 352. At this time, biometric authentication is designated by using an enhancement parameter of the API or the like. In step S805, the OS 351 displays the requested UI control on the application 361. At this time, the biometric authentication icon 512 is displayed on the UI control of the integrated biometric authentication. In step S806, the application 361 sets, to the OS 351, an event listener for the relevant UI control. At this time, an RP ID of the designated web application 311 is added to the UI control of the integrated biometric authentication as an enhancement parameter of the event listener. The OS 351 also records the RP ID in a local storage area of the OS 351.

As a result of the above processing, a UI screen of the application 361 of step S701 in FIG. 7 is displayed on the touch panel display 210 of the computer 111.

In step S807, the user operates one of UI controls on the screen illustrated in step S701 of FIG. 7. More specifically, as illustrated in step S702 of FIG. 7, the user touches (presses) a UI control of the integrated biometric authentication with, for example, a user's finger.

In step S808, when the operation of one of the UI controls is detected, the OS 351 generates a one-time random number Nonce and records the Nonce in the local storage area of the OS 351. The Nonce is used as verification data to track and verify from which UI control as a starting point the biometric authentication is executed. In step S809, the OS 351 notifies the application 361 of a UI control operation event. At this point, the generated Nonce is added to the event.

In step S810, the application 361 analyzes the event received from the OS 351 to determine whether the event is an operation event on the control for which a biometric authentication request is designated. In step S811, if the determination in step S810 is No (NO in step S810), the event is processed as a normal UI control operation event. Since the example of FIG. 7 is a case in which a Cancel button is operated, processing such as transition to an initial screen without performing biometric authentication or the like will be performed. If the determination in step S810 is Yes (YES in step S810), the processing proceeds to step S812.

In step S812, the application 361 transmits an authentication start request as a processing request to the web application 311, with a uniform resource locator (URL) that has been detected in step S807 and for which processing requested by the user operation illustrated in step S702 is performed set as a destination. At this time, the Nonce received from the OS 351 is added to the request.

In step S813, the web application 311 transmits an authentication start trigger to the authentication server 321 in response to the reception of the authentication start request. The authentication server 321 generates Challenge as verification data in step S814 and responds to the web application 311 with the Challenge generated in step S815. In step S816, the web application 311 responds to the application 361 with the generated Challenge, RP ID, and Nonce. In the present disclosure, the Nonce is added, in addition to the Challenge and the RP ID, to an authentication request (assertion request) transmitted from the authentication server 321 via the web application 311.

In step S817, the application 361 transmits the assertion request to the OS 351 via the platform API 352 in response to receipt of the authentication request. At this time, the Challenge, the RP ID, and the Nonce are added to the request.

In step S818, the OS 351 determines whether the RP ID and the Nonce received in step S817 match those recorded in steps S806 and S808. If, as the determination result in step S818, they are not matched (NO in step S818), in step S819, the application 361 displays an error response to interrupt the processing. If they are matched as the determination result in step S818 (YES in step S818), the processing proceeds to step S820. In step S820, the OS 351 transmits, to the authenticator 355, a biometric authentication request including the Challenge. At this time, an area of the biometric information sensor corresponding to a display area of the relevant UI control is designated as an enhancement parameter.

In a short period between steps S807 to S820, a user operation on the UI control illustrated in step S702 of FIG. 7 is performed. In the meantime, the user inputs biometric information into the computer 111.

In step S821, the authenticator 355 acquires the result of the biometric authentication using biometric information read by the biometric information sensor 212 from the area designated as the enhancement parameter and corresponding to the display area of the UI control. The biometric authentication is determined to be successful if a matching rate of the biometric information or the feature amounts thereof stored in the TPM 221 in advance and the biometric information or the feature amounts thereof read by the biometric information sensor 212 is high. In step S823, the authenticator 355 verifies the authentication result and, if the authentication is successful, extracts the secret key corresponding to the relevant biometric information from the TPM 221. In step S824, the authenticator 355 generates signature data using the extracted secret key and the Challenge received in step S820. In step S825, the authenticator 355 returns an assertion including the generated signature data to the OS 351 as an authentication response. In step S826, the OS 351 returns the assertion including the generated signature data to the application 361 as an authentication response.

In step S827, the application 361 transmits the assertion including the signature data generated in step S824 to the web application 311.

In step S828, the web application 311 transmits the received assertion to the authentication server 321 to request verification thereof.

In step S829, the authentication server 321 verifies the signature data included in the assertion by using the public key stored when the authenticator is registered. In step S830, based on the assertion verification in step S829, the authentication server 321 responds with an authentication result of a success or failure. More specifically, the authentication server 321 extracts the Challenge from the signature data by using the public key and confirms whether the Challenge is the same as the Challenge generated in step S814. If the Challenges match as a confirmation result, the web application 311 is notified of the success as the authentication result.

In step S831, the web application 311 processes a request content in step S812 when the authentication is successful. In the example in step S702, for example, the processing is order processing of a product designated by the UI control operated by the user.

In step S832, the web application 311 responds to the application 361 with the authentication result. If the authentication result is a success, content data including the processing result when the authentication is successful in step S831 is provided.

In step S833, the application 361 displays, on the touch panel display 210 of the computer 111, the content including information of the authentication result and the processing result to notify the user of these results. The display is as illustrated in step S703 of FIG. 7 and the processing result for the order processing request in step S702 is displayed.

First Modification Example

Figure 9A:
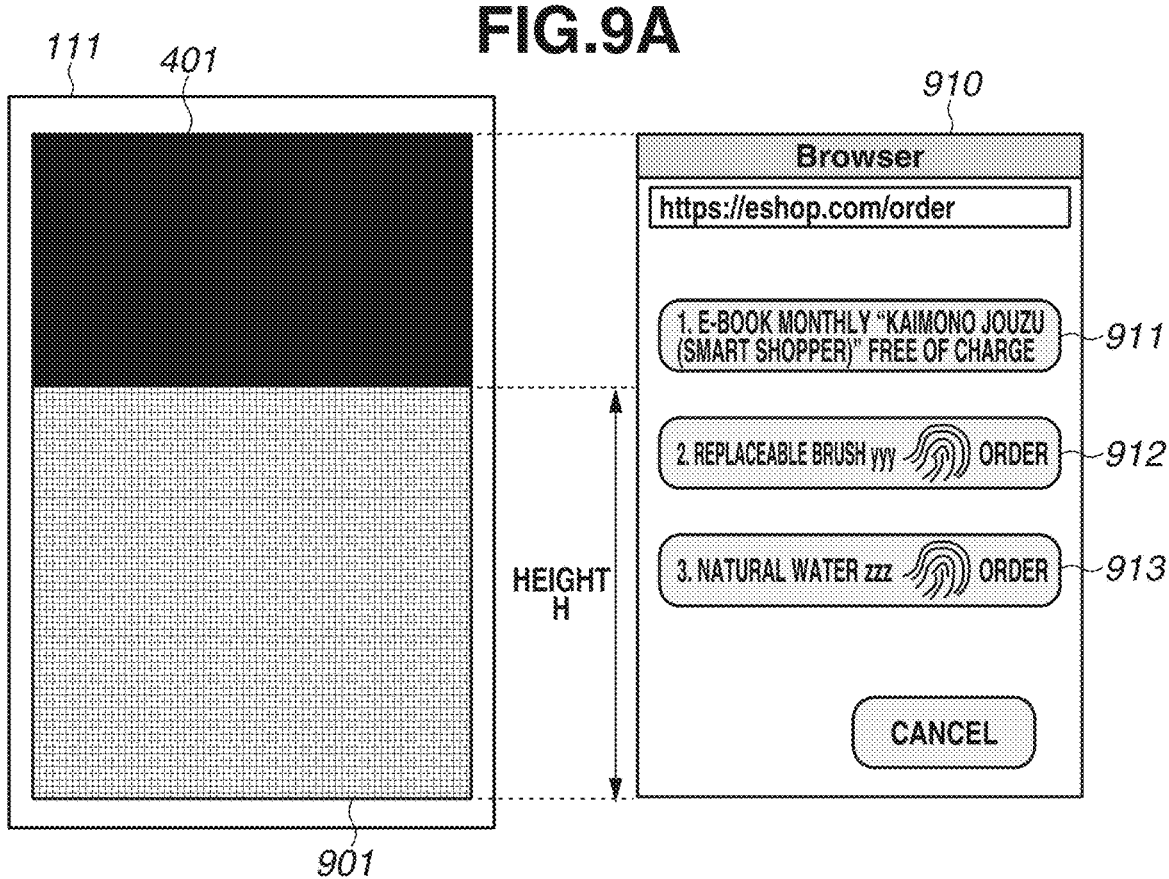
FIGS. 9A and 9B illustrate user interface examples depending on hardware specifications of the computer.
Figure 9B:
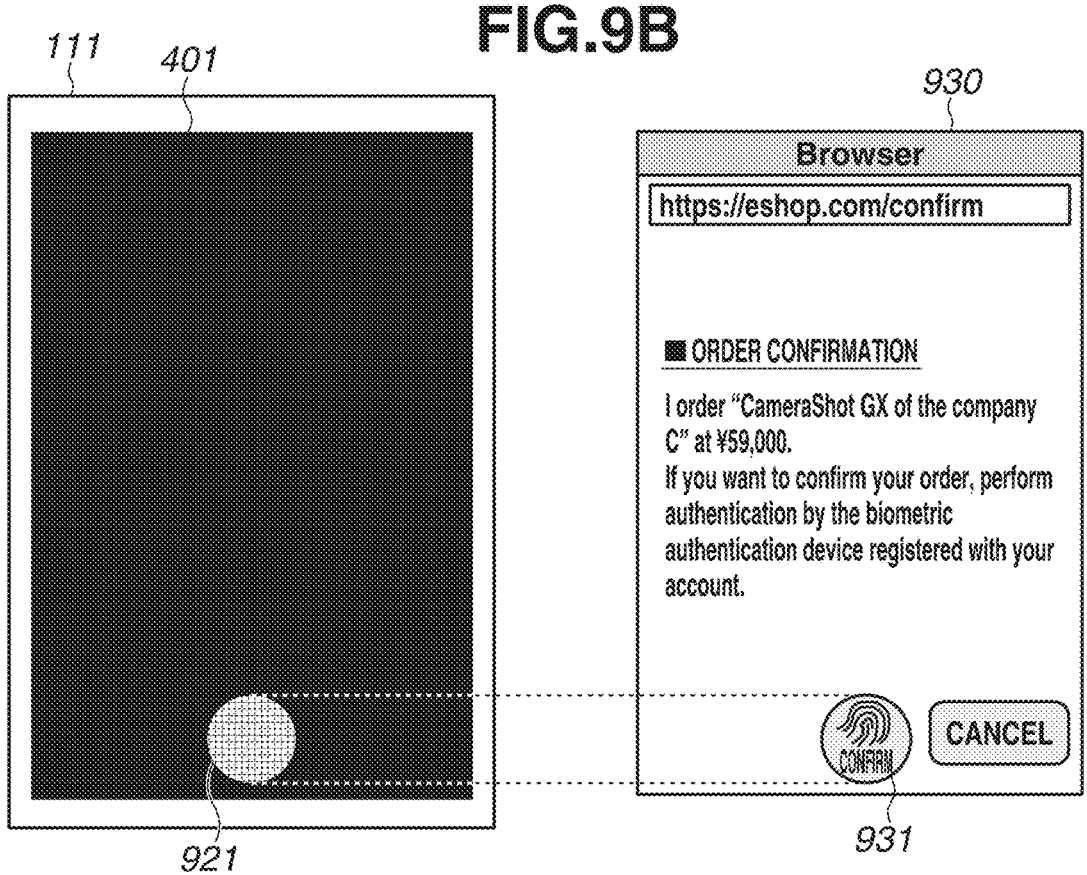

FIGS. 9A and 9B illustrate configuration examples, which are different from the configuration in FIG. 4, when an area of a biometric information sensor is present in a portion inside a touch panel display area.

In FIG. 9A, a detectable area 901 is an area in which a biometric information sensor 212 can detect biometric information. A portion up to a height H of a displayable range and a touch operation detectable area 401 of the touch panel display is a detectable area of the biometric information sensor 212.

A UI 910 is a UI example of an application 361. Controls 911 to 913 are examples of UI controls. Since the control 911 is outside the detectable area of the biometric information sensor 212, a standard UI control is arranged therein. Since the controls 912, 913 are inside the detectable area of the biometric information sensor 212, a UI control of the integrated biometric authentication can be arranged therein.

Second Modification Example

In FIG. 9B, a detectable area 921 is an example in which a detectable area of a biometric information sensor 212 is more restrictive.

A UI 930 is a UI example of an application 361. An area 931 is, like the controls 912 and 913, a UI control of the integrated biometric authentication. When the detectable area of the biometric information sensor 212 is restrictive in this way, a position where the UI control of the integrated biometric authentication can be arranged and the number thereof are limited.

When the detectable area of the biometric information sensor 212 is restrictive or the biometric information sensor 212 is independently provided in a position unrelated to a displayable range and a touch operation detectable area 401 of a touch panel display, an issue can arise. More specifically, it can be difficult to arrange a UI control of the integrated biometric authentication in a desired position and to apply the UI control processing of the integrated biometric authentication described with reference to FIGS. 7 and 8. The issue differs depending on hardware specifications, such as a mounting position, and the detectable area of the biometric information sensor 212 of a computer 111.

Figure 10:
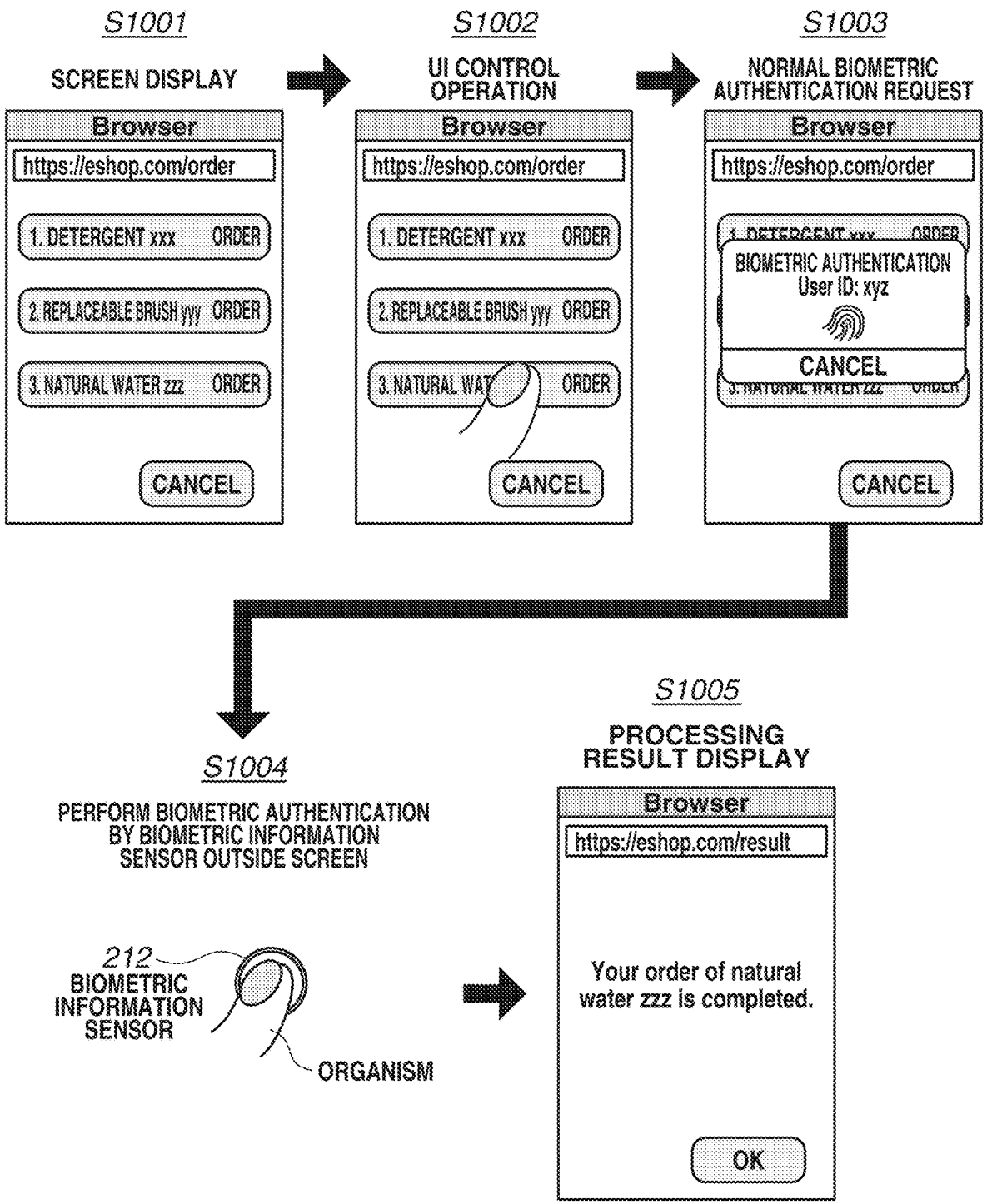
FIG. 10 illustrates a user interface screen transition example according to a second modification.
Figure 11:
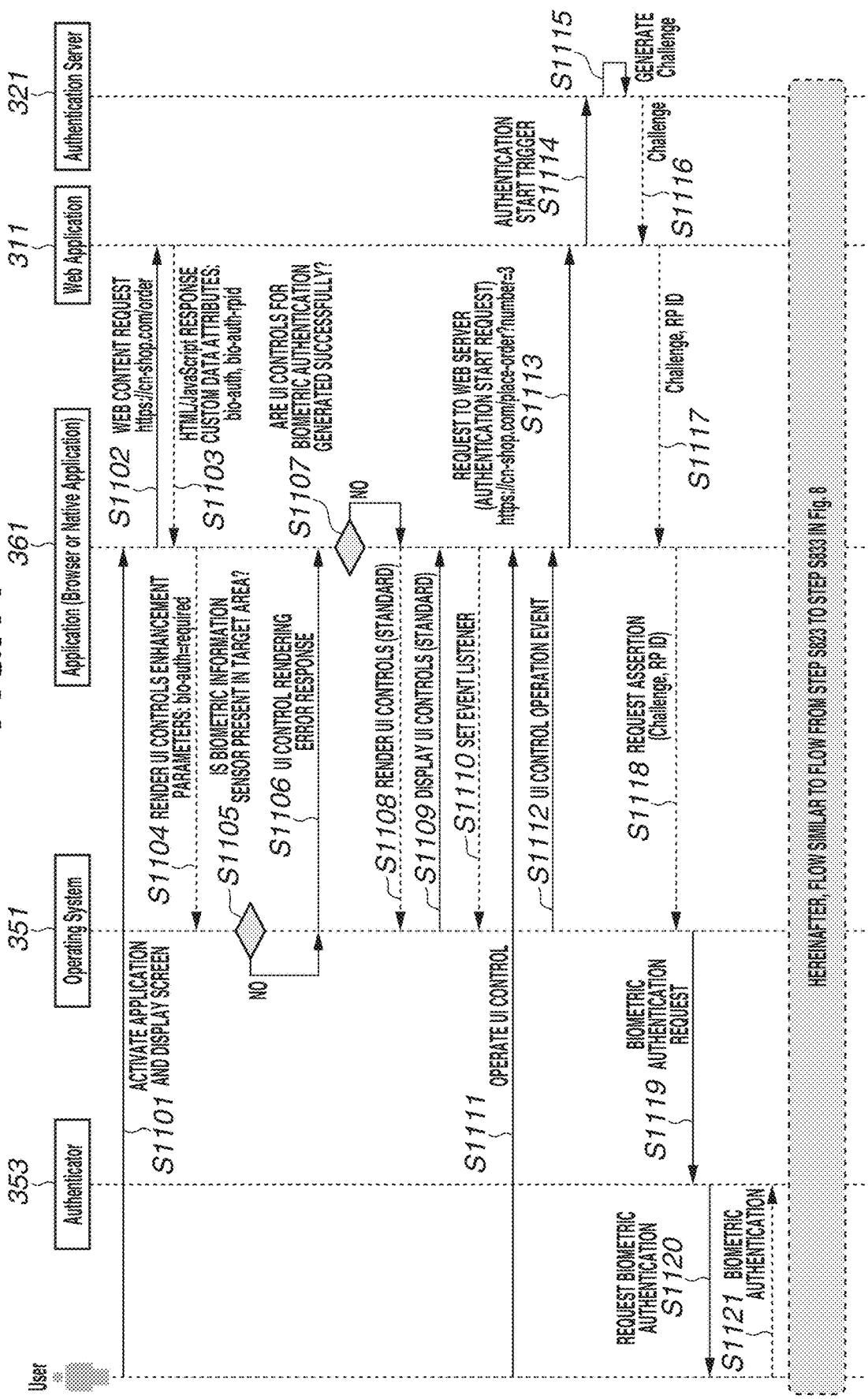
FIG. 11 illustrates a sequence of overall processing by a computer and a server according to the second modification.

FIGS. 10 and 11 illustrate an alternative processing flow when a UI control of the integrated biometric authentication cannot be used, i.e., implementation of such UI control is difficult, due to differences of the hardware specifications of the computer 111 as described above.

FIG. 11 is a diagram illustrating a sequence of overall processing including user operations by the computer 111 and a server 121 described in the second modification example.

In step S1101, a user operates the application 361 to request activation of an application or screen display. Steps S1102 to S1104 are similar to steps S802 to S804 described with reference to FIG. 8 and thus, the description thereof is omitted.

In step S1105, an OS 351 determines whether the biometric information sensor 212 is present in a display area of UI controls of the integrated biometric authentication as the hardware specifications of the computer 111. If the determination in step S1105 is NO (the biometric information sensor 212 is not present in a display area of UI controls that integrate biometric authentication), in step S1106, an error response to a UI control rendering request is returned to the application 361.

In step S1107, the application 361 determines whether generation of a UI control for biometric authentication is successful. When an error response is returned from the OS 351, it is determined that the generation of a UI control for biometric authentication has failed. If the determination in step S1107 is NO, in step S1108, the application 361 requests the OS 351 to render a standard UI control while coordinates and sizes remain unchanged.

In step S1109, the OS 351 renders the standard UI control on a touch panel display 210.

In step S1110, the application 361 sets an event listener for the relevant UI control to the OS 351.

As a result of the above processing, a UI screen of the application 361 of step S1001 in FIG. 10 is displayed on the touch panel display 210 of the computer 111. A biometric authentication icon 512 is not present in any of the UI controls, which is different from the screen illustrated in step S701 of FIG. 7.

In step S1111, the user operates any one of UI controls on the screen illustrated in step S1001 of FIG. 10. More specifically, as illustrated in step S1002 of FIG. 10, the user touches (presses) a UI control with the user's finger.

In step S1112, the OS 351 notifies the application 361 of an operation event to the UI control. In step S1113, the application 361 transmits an authentication start request to a web application 311 in response to the event notification, with a URL for which processing corresponding to the UI control target of the user operation set as a destination.

Steps S1114 to S1116 are similar to steps S813 to S815 described above and thus, the description thereof is omitted. In step S1117, the web application 311 responds to the application 361 with Challenge and an RP ID.

In step S1118, the application 361 transmits an assertion request to the OS 351 via a platform API 352. At this time, the Challenge and the RP ID are added to the request.

In step S1119, the OS 351 transmits a biometric authentication request to an authenticator 355.

In step S1120, the authenticator 355 additionally displays, as illustrated in step S1003 of FIG. 10, the screen to request biometric authentication from the user, on the touch panel display 210 of the computer 111. As illustrated in step S1004 of FIG. 10, the user causes the biometric information sensor 212 of the computer 111 to read, for example, a user's finger. In step S1121, biometric authentication is executed in response to input work of user's biometric information. Hereinafter, the steps are similar to steps S823 to S833 in FIG. 8 and thus, the description thereof is omitted. In the present sequence, as a result of biometric authentication, a processing result is displayed, like in step S833, as illustrated in step S1005 of FIG. 10.

Application Example

Figure 12:
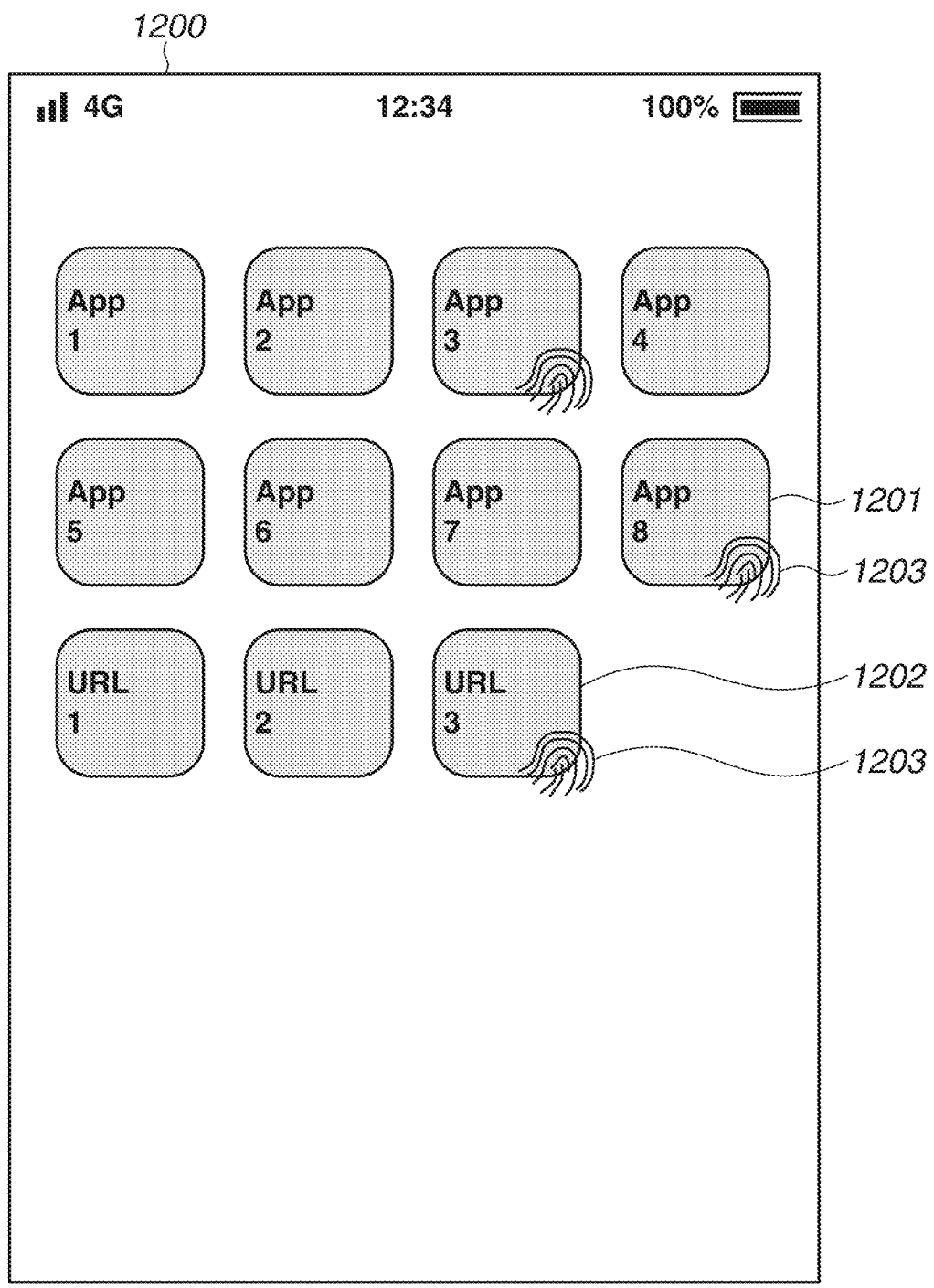
FIG. 12 is a diagram illustrating an implementation example of the user interface of an application example according to an exemplary embodiment.
Figure 13:
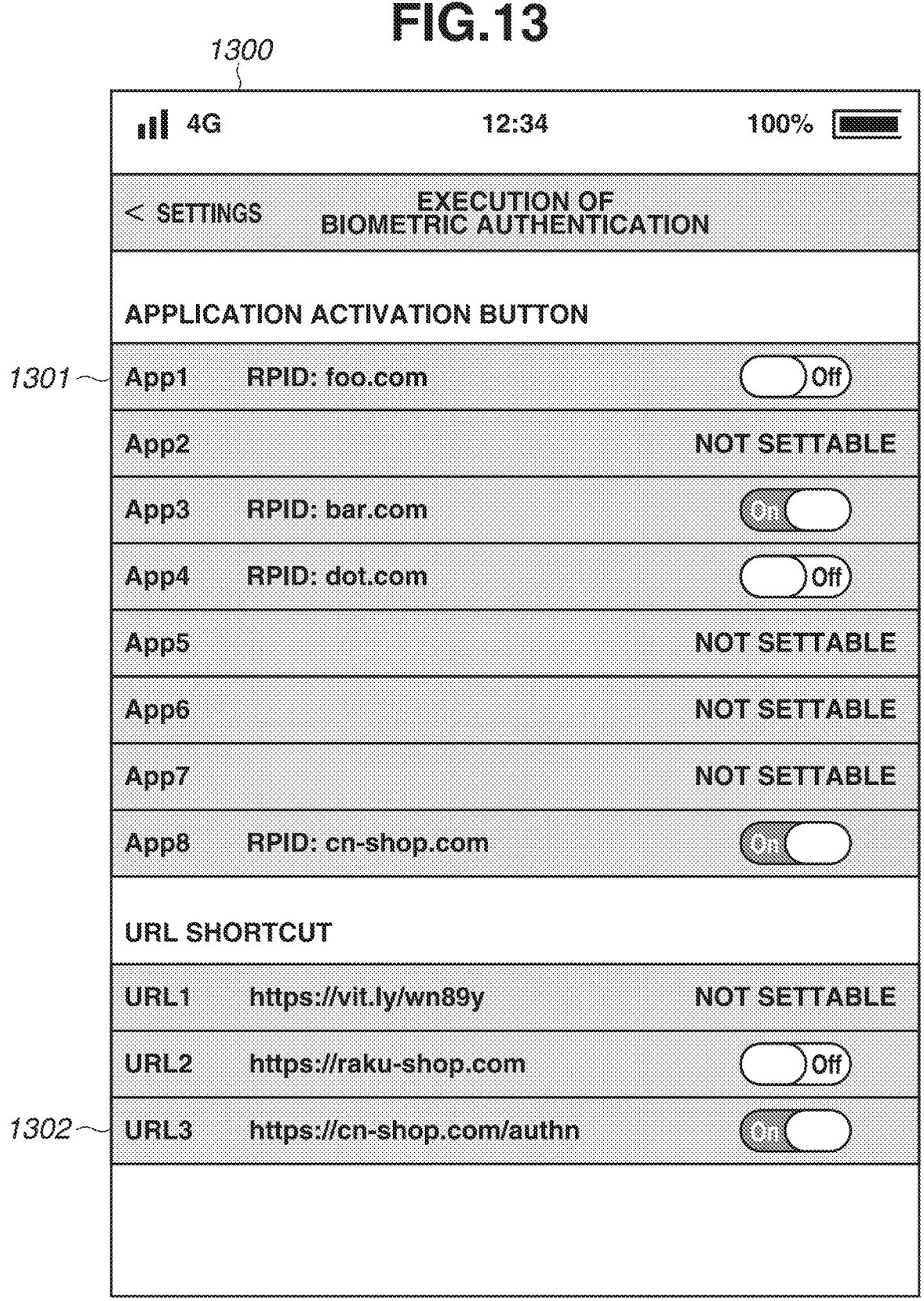
FIG. 13 illustrates an execution setting screen of biometric authentication.

Next, application examples in which the above-described UI controls that integrate biometric authentication are applied to other use cases are described with reference to FIGS. 12, 13, and 14.

A UI 1200 of a desktop or a home screen is provided and displayed on a touch panel display 210 of a computer 111 by an OS 351. Buttons 1201, 1202 are button-type UI controls. The button 1201 is an activation button of an application 361. The button 1202 is an activation button of a URL shortcut. An icon 1203 is a biometric authentication icon 512 described with reference FIG. 5. Presence/absence of the biometric authentication icon 1203 indicates whether an application activation button or a URL shortcut activation button is an UI control of the integrated biometric authentication.

A UI 1300 is a UI to set execution of biometric authentication for the application activation button or the URL shortcut activation button. An area 1301 is an example in which the execution of biometric authentication is set to the activation button of the application 361 called "App1". The application 361 called "App1" can use a biometric authentication flow by using a domain "foo.com" of a web application 311 as an RP ID. In the present embodiment, the execution setting of biometric authentication is Off, so the biometric authentication icon 1203 is not displayed in the activation button of the "App1" of the UI 1200. An area 1302 is an example in which the execution of biometric authentication is set to the activation button of the URL shortcut called "URL3". In the area 1302, a destination URL of the shortcut of the "URL3" is "https://cn-shop.com/authn". In the present embodiment, the execution setting of biometric authentication is On, so the biometric authentication icon 1203 is displayed in the activation button of the "URL3" of the UI 1200. An application activation button or a URL shortcut activation button in which "Not settable" is displayed does not use biometric authentication.

Figure 14:
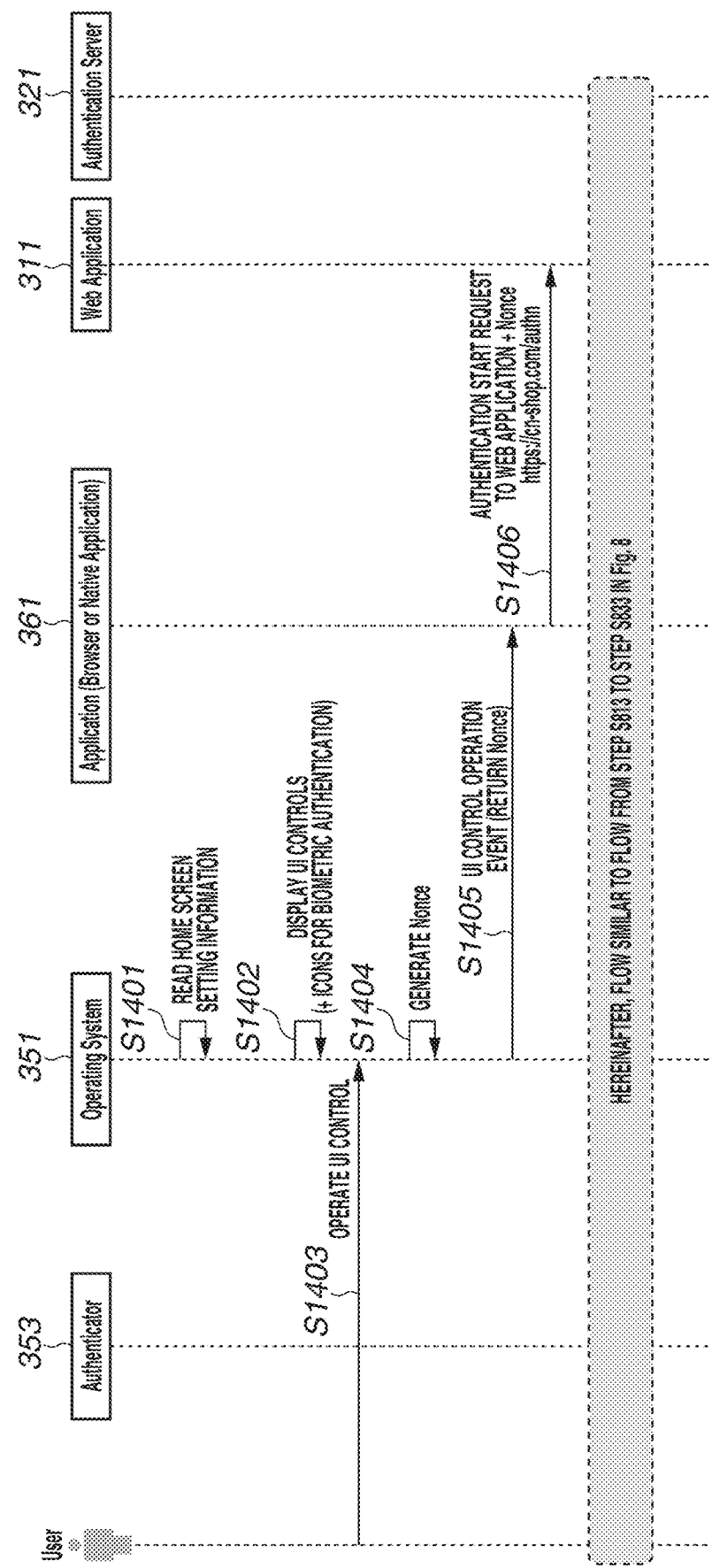
FIG. 14 illustrates a sequence of overall processing by a computer and a server of the application example.

FIG. 14 illustrates a flow when the application activation button or the URL shortcut activation button is processed as a UI control of the integrated biometric authentication.

In step S1401, the OS 351 reads the activation button of an application or a URL shortcut displayed on the desktop or the home screen and also reads the execution setting of biometric authentication illustrated in the UI 1300. In step S1402, the OS 351 renders and displays a UI control including the biometric authentication icon 1203 on the touch panel display 210 of the computer 111 for a button for which the execution setting of biometric authentication is set to On. A display result is the UI 1200 in FIG. 12.

In step S1403, the user operates the application activation button 1201 or the URL shortcut activation button 1202 to activate the application or to request opening of the URL shortcut by a browser.

In step S1404, the OS 351 generates, like in step S808 described above, Nonce. In step S1405, the OS 351 notifies the application 361 of a UI control operation event. At this time, the generated Nonce is added to the event.

In step S1406, if the execution setting of biometric authentication of the relevant activation button is On, the application 361 transmits, based on the execution setting of biometric authentication of the UI 1300, an authentication start request to the web application 311 as a processing request. At this time, the received Nonce is added to the request. Steps are similar to steps S813 to S833 described with reference to FIG. 8. If the biometric authentication based on biometric information read by the biometric information sensor 212 corresponding to a position of the biometric authentication icon 1203 is successful and also verification by an authentication server 321 is successful, the application 361 designated by the user in step S1403 is activated and an initial screen is displayed.

As described above, when a part device in which a biometric authentication sensor is contained in a touch panel display is usable, a unit that integrates a UI operation and biometric authentication into one UI operation that is intuitive and easy to understand can be provided. In particular, a unit for simultaneously executing biometric authentication only on operations on a display area of a designated UI control can be provided. Accordingly, convenience and operability of a user when a biometric authentication operation is performed can be improved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-128048, filed Jun. 29, 2017, which is hereby incorporated by reference herein in its entirety.

What is claimed is:

1. An information processing apparatus, comprising:
an authentication module that executes biometric authentication;
a storage area having tamper resistance, wherein the storage area stores biometric information of a user required when authentication processing is performed by the authentication module;
a display;
a biometric information sensor that reads the biometric information, wherein the biometric information sensor is arranged in the information processing apparatus and configured to read the biometric information in at least a part of an operation area on the display;
a memory storing instructions; and
a processor executing the instructions causing the information processing apparatus to:
display in a screen on the display a first control to accept a user operation and start a first processing request, wherein the first control is displayed in a state where information indicating that authentication is requested is added to the first control, and the first control is arranged and displayed in a readable area of the biometric information sensor;
display in the same screen on the display a second control to accept a user operation and start a second processing request, wherein the second control is displayed without adding the information indicating that the biometric authentication is requested, and wherein generation instruction information for displaying the first control and the second control is provided from a web application communicating with the information processing apparatus;
make the first processing request corresponding to the first control when the user operation on the displayed first control is detected;
transmit, to a request destination of the first processing request, data based on a result of the biometric authentication by the authentication module using the biometric information stored in the storage area and biometric information read via the biometric information sensor at a position where the first control, which is a user operation target, is displayed, and
make the second processing request corresponding to the second control without performing the biometric authentication when another user operation on the displayed second control is detected.

2. The information processing apparatus according to claim 1,
wherein a web browser in the information processing apparatus displays the first control and the second control based on the generation instruction information, and
wherein the first processing request is transmitted to the web application included in a system that is the request destination.

3. The information processing apparatus according to claim 1,
wherein in a case where the biometric information cannot be read by the biometric information sensor in a display area of the first control, another control is displayed without adding the information indicating that the biometric authentication is requested, and
wherein in a case where the user operation on the another control is detected, a screen to request the biometric authentication from the user is displayed.

4. The information processing apparatus according to claim 1, wherein the biometric information is information related to the user's fingerprints.

5. The information processing apparatus according to claim 1,
wherein the first control is an activation button of an application installed on the information processing apparatus, and
wherein an initial screen of the application is displayed on the display as the information related to the processing corresponding to the first control based on the processing request and the data based on the result of the biometric authentication.

6. The information processing apparatus according to claim 5, wherein whether to add the information indicating that the authentication is requested to the activation button is set for each application installed on the information processing apparatus.

7. The information processing apparatus according to claim 1, wherein, in a case where an authentication request including challenge data is made from the request destination of the first processing request, a response including signature data generated using the challenge data and a secret key extracted from the storage area when the biometric authentication executed by the authentication module is successful is transmitted to the request destination, as the data based on the result of the biometric authentication by the authentication module.

8. The information processing apparatus according to claim 7, wherein verification data generated by the information processing apparatus in response to the user operation on the first control is added to the first processing request, and wherein in a case where the authentication request including the verification data is made from the request destination of the first processing request, the authentication module executes the biometric authentication.

9. The information processing apparatus according to claim 7, wherein the secret key generated when the biometric information is stored is stored in the storage area, wherein a public key corresponding to the secret key is registered in a system that is the request destination of the first processing request, and wherein the signature data is verified by the system using the public key.

10. A method for an information processing apparatus including an authentication module that performs biometric authentication, a storage area having tamper resistance and storing biometric information, a display, and a biometric information sensor that reads the biometric information, wherein the biometric information sensor is arranged in the information processing apparatus and configured to read the biometric information in at least a part of an operation area on the display, the method comprising:

displaying in a screen on the display a first control to accept a user operation and start a first processing request, wherein the first control is displayed in a state where information indicating that authentication is requested is added to the first control, and the first control is arranged and displayed in a readable area of the biometric information sensor;

displaying in the same screen on the display a second control to accept a user operation and start a second processing request, wherein the second control is displayed without adding the information indicating that the biometric authentication is requested, and wherein generation instruction information for displaying the first control and the second control is provided from a web application communicating with the information processing apparatus;

making the first processing request corresponding to the first control when the user operation on the displayed first control is detected;

transmitting, to a request destination of the first processing request, data based on a result of the biometric authentication by the authentication module using the biometric information stored in the storage area and biometric information read via the biometric information sensor at a position where the first control, which is a target of the user operation, is displayed, and making the second processing request corresponding to the second control without performing the biometric authentication when another user operation on the displayed second control is detected.

11. The method according to claim 10, wherein a web browser in the information processing apparatus displays the first control and the second control based on the generation instruction information, and wherein the first processing request is transmitted to the web application included in a system that is the request destination.

12. The method according to claim 10, wherein in a case where the biometric information cannot be read by the biometric information sensor in a display area of the first control, another control is displayed without adding the information indicating that the biometric authentication is requested, and wherein in a case where the user operation on the another control is detected, a screen to request the biometric authentication from the user is displayed.

13. The method according to claim 10, wherein the first control is an activation button of an application installed on the information processing apparatus, and wherein an initial screen of the application is displayed on the display as the information related to the processing corresponding to the first control based on the processing request and the data based on the result of the biometric authentication.

14. The method according to claim 10, wherein the biometric information is information related to the user's fingerprints.

15. The method according to claim 10, wherein, in a case where an authentication request including challenge data is made from the request destination of the first processing request, a response including signature data generated using the challenge data and a secret key extracted from the storage area when the biometric authentication executed by the authentication module is successful is transmitted to the request destination, as the data based on the result of the biometric authentication by the authentication module.

16. The method according to claim 15, wherein verification data generated by the information processing apparatus in response to the user operation on the first control is added to the first processing request, and wherein in a case where the authentication request including the verification data is made from the request destination of the first processing request, the authentication module executes the biometric authentication.

17. The method according to claim 15, wherein the secret key generated when the biometric information is stored is stored in the storage area, wherein a public key corresponding to the secret key is registered in a system that is the request destination of the first processing request, and wherein the signature data is verified by the system using the public key.

18. A non-transitory computer readable storage medium storing a computer program for causing a computer to execute a method for an information processing apparatus including an authentication module that executes biometric authentication, a storage area having tamper resistance and storing biometric information, a display, and a biometric information sensor that reads biometric information, wherein the biometric information sensor is arranged in the information processing apparatus and configured to read the biometric information in at least a part of an operation area on the display, the method comprising:

displaying in a screen on the display a first control to accept a user operation and start a first processing request, wherein the first control is displayed in a state where information indicating that authentication is requested is added to the first control, and the first control is arranged and displayed in a readable area of the biometric information sensor;

displaying in the same screen on the display a second control to accept a user operation and start a second processing request, wherein the second control is displayed without adding the information indicating that the biometric authentication is requested, and wherein generation instruction information for displaying the first control and the second control is provided from a web application communicating with the information processing apparatus;

making the first processing request corresponding to the first control when the user operation on the displayed first control is detected;

transmitting, to a request destination of the first processing request, data based on a result of the biometric authentication by the authentication module using the biometric information stored in the storage area and biometric information read via the biometric information sensor at a position where the first control, which is a target of the user operation, is displayed, and making the second processing request corresponding to the second control without performing the biometric authentication when another user operation on the displayed second control is detected.

19. A system comprising:

an information processing apparatus including an authentication module that executes biometric authentication, a storage area having tamper resistance, a display, a biometric information sensor that reads biometric information, a memory storing instructions, and a processor that executes the instructions; and a server communicating with the information processing apparatus, wherein the biometric information sensor is arranged in the information processing apparatus and configured to read the biometric information in at least a part of an operation area on the display, wherein the instructions cause the information processing apparatus to:

display, in a screen on the display a first control to accept a user operation and start a first processing request, wherein the first control is displayed in a state where information indicating that authentication is requested is added to the first control, and the first control is arranged and displayed in a readable area of the biometric information sensor;

display in the same screen on the display a second control to accept a user operation and start a second processing request, wherein the second control is displayed without adding the information indicating that the biometric authentication is requested, and wherein generation instruction information for displaying the first control and the second control is provided from the server communicating with the information processing apparatus;

make the first processing request corresponding to the first control to the server when the user operation on the displayed first control is detected;

transmit, to the server, data based on a result of the biometric authentication by the authentication module using the biometric information stored in the storage area and biometric information read via the biometric information sensor at a position where the first control, which is a target of the user operation, is displayed, and make the second processing request corresponding to the second control without performing the biometric authentication when another user operation on the displayed second control is detected.

* * * * *